(12) United States Patent
Suzuki

(10) Patent No.: US 7,013,923 B2
(45) Date of Patent: Mar. 21, 2006

(54) METAL BELLOWS HYDRAULIC ACCUMULATOR

(75) Inventor: Kenichi Suzuki, Nishikamo-gun (JP)

(73) Assignee: Advics Co., Ltd., Kariya (JP)

( * ) Notice: Subject to any disclaimer, the term of this patent is extended or adjusted under 35 U.S.C. 154(b) by 91 days.

(21) Appl. No.: 10/840,643

(22) Filed: May 7, 2004

(65) Prior Publication Data
US 2005/0028879 A1  Feb. 10, 2005

(30) Foreign Application Priority Data
Aug. 6, 2003  (JP)  ............................. 2003-287593

(51) Int. Cl.
*F16L 55/04* (2006.01)
(52) U.S. Cl. .......................... 138/30; 60/413
(58) Field of Classification Search ................ 92/34; 60/413, 454; 138/26, 30, 31
See application file for complete search history.

(56) References Cited

U.S. PATENT DOCUMENTS 3,456,673 A * 7/1969 Legrand .................. 138/30
4,995,485 A * 2/1991 Nakamura et al. ...... 188/322.17
6,871,672 B1 * 3/2005 Kurokawa et al. ............ 138/31

FOREIGN PATENT DOCUMENTS

JP  2001124001 A  *  5/2001
JP  2002-155901      5/2002

* cited by examiner

*Primary Examiner*—Thomas E. Lazo
*Assistant Examiner*—Igor Kershteyn
(74) *Attorney, Agent, or Firm*—Buchanan Ingersoll PC

(57) ABSTRACT

A metal bellows hydraulic accumulator includes a bellows unit having a metal bellows portion and disposed within a pressure space of a pressure vessel, whereby the pressure space is sectioned into a gas chamber and a liquid chamber communicating with a liquid passage. The liquid chamber is sectioned into a first liquid chamber to which the bellows portion of the bellows unit is exposed, and a second liquid chamber to which the liquid passage is opened. An open-close valve is provided so as to establish and break communication between the first and second liquid chambers. A filter for separating foreign matter contained in operating liquid flowing toward the liquid passage, and a foreign-matter storing section capable of storing the foreign matter are provided in the second liquid chamber.

4 Claims, 3 Drawing Sheets

METAL BELLOWS HYDRAULIC ACCUMULATOR

BACKGROUND OF THE INVENTION

1. Field of the Invention

The present invention relates to a hydraulic accumulator capable of accumulating an operating liquid under pressure (i.e., capable of accumulating a pressurized operating liquid) in a liquid chamber formed within a shell serving as a pressure vessel. More specifically, the present invention relates to a metal bellows hydraulic accumulator in which a bellows unit for dividing the interior of the shell into a gas chamber and a liquid chamber has a bellows portion formed of metal.

2. Description of the Related Art

A metal bellows hydraulic accumulator of such a type is disclosed in, for example, Japanese Patent Application Laid-Open (kokai) No. 2002-155901. In the disclosed metal bellows hydraulic accumulator, a bellows unit having a bellows portion formed of metal is disposed within a pressure space formed in a pressure vessel, whereby the pressure space is sectioned into a gas chamber filled with a predetermined pressurized gas, and a liquid chamber communicating with a liquid passage formed in the pressure vessel. The liquid chamber is further sectioned into a first liquid chamber to which the bellows portion of the bellows unit is exposed, and a second liquid chamber to which the liquid passage is opened. Further, an open-close valve is provided between the first and second liquid chambers. When the open-close valve is opened, the first and second liquid chambers communicate with each other. When the open-close valve is closed, the first and second liquid chambers are brought out of mutual communication, whereby the amount of contraction of the bellows portion of the bellows unit is restricted.

In the above-described conventional metal bellows hydraulic accumulator, so long as the open-close valve functions properly, the amount of contraction of the bellows portion of the bellows unit is restricted upon closure of the open-close valve, whereby the bellows unit is protected. However, when the open-close valve becomes unable to properly function because of breakage of a constituent member thereof, protection of the bellows unit is not expected, and debris produced as a result of breakage of the constituent member is mixed into operating liquid as foreign matter. Such foreign matter flows out of the accumulator together with the operating liquid, and may adversely affect a hydraulic circuit including the accumulator.

SUMMARY OF THE INVENTION

In view of the foregoing, an object of the present invention is to provide a metal bellows hydraulic accumulator which can prevent foreign matter such as debris from flowing out of the accumulator, to thereby minimize the influence of the foreign matter on a hydraulic circuit including the accumulator.

In order to achieve the above object, the present invention provides a metal bellows hydraulic accumulator comprising: a pressure vessel defining a pressure space; a bellows unit having a bellows portion formed of metal, the bellows unit being disposed within the pressure space and sectioning the pressure space into a gas chamber filled with a pressurized gas, and a liquid chamber communicating with a liquid passage formed in the pressure vessel; a partition member for sectioning the liquid chamber into a first liquid chamber to which the bellows portion of the bellows unit is exposed, and a second liquid chamber to which the liquid passage is opened; an open-close valve which establishes communication between the first liquid chamber and the second liquid chamber when opened, and breaks the communication between the first liquid chamber and the second liquid chamber when closed, to thereby restrict the amount of contraction of the bellows portion of the bellows unit; separation means, provided in the second liquid chamber, for separating foreign matter contained in operating liquid flowing toward the liquid passage; and a foreign-matter storing section provided in the second liquid chamber, the foreign-matter storing section having an open upper end and a closed bottom portion, and being capable of storing the foreign matter.

In the metal bellows hydraulic accumulator of the present invention, the separation means for separating foreign matter contained in operating liquid flowing toward the liquid passage, and the foreign-matter storing section having an open upper end and a closed bottom portion and being capable of storing the foreign matter are provided in the second liquid chamber, to which the liquid passage formed in the pressure vessel is opened. Therefore, in the case where the open-close valve becomes unable to properly function because of breakage of a constituent member thereof, and debris produced as a result of breakage of the constituent member is mixed into operating liquid as foreign matter, or in the case where foreign matter generated upstream of the hydraulic accumulator is mixed into operating liquid, the separation means separates the foreign matter contained in operating liquid flowing toward the liquid passage, and the separated foreign matter is stored in the foreign-matter storing section, whereby the foreign matter is prevented from flowing out of the hydraulic accumulator. Therefore, the above-described foreign matter does not adversely influence the hydraulic circuit outside the accumulator, whereby the influence on the hydraulic circuit including the accumulator can be minimized.

Preferably, the liquid passage includes an inflow passage for allowing operating liquid to flow from the outside of the pressure vessel to the second liquid chamber, and an outflow passage for allowing operating liquid to flow from the second liquid chamber to the outside of the pressure vessel; and a filter serving as the separation means is provided at a second-liquid-chamber-side end of the outflow passage in order to separate the foreign matter and prevent the foreign matter from flowing to the outside.

In this case, the metal bellows hydraulic accumulator may have a structure such that the outflow passage is formed coaxially with the inflow passage to surround the inflow passage; the foreign-matter storing section is formed around a cylindrical wall which forms the outflow passage; and the filter assumes a taper shape so as to cause the foreign matter to fall down, along the outer circumferential surface thereof, toward the foreign-matter storing section. Alternatively, the metal bellows hydraulic accumulator may have a structure such that the inflow passage is formed coaxially with the outflow passage to surround the outflow passage; the foreign-matter storing section is formed around a cylindrical wall which forms the inflow passage; and the cylindrical wall assumes a taper shape so as to cause foreign matter to fall down, along the outer circumferential surface thereof, toward the foreign-matter storing section. In these cases, the tapered filter or cylindrical wall can cause foreign matter, separated by the filter, to fall down toward the foreign-matter storing section and to be stored and held there without fail.

BRIEF DESCRIPTION OF THE DRAWINGS

Various other objects, features and many of the attendant advantages of the present invention will be readily appreciated as the same becomes better understood by reference to the following detailed description of the preferred embodiments when considered in connection with the accompanying drawings, in which.

DESCRIPTION OF THE PREFERRED EMBODIMENTS

Figure 1:
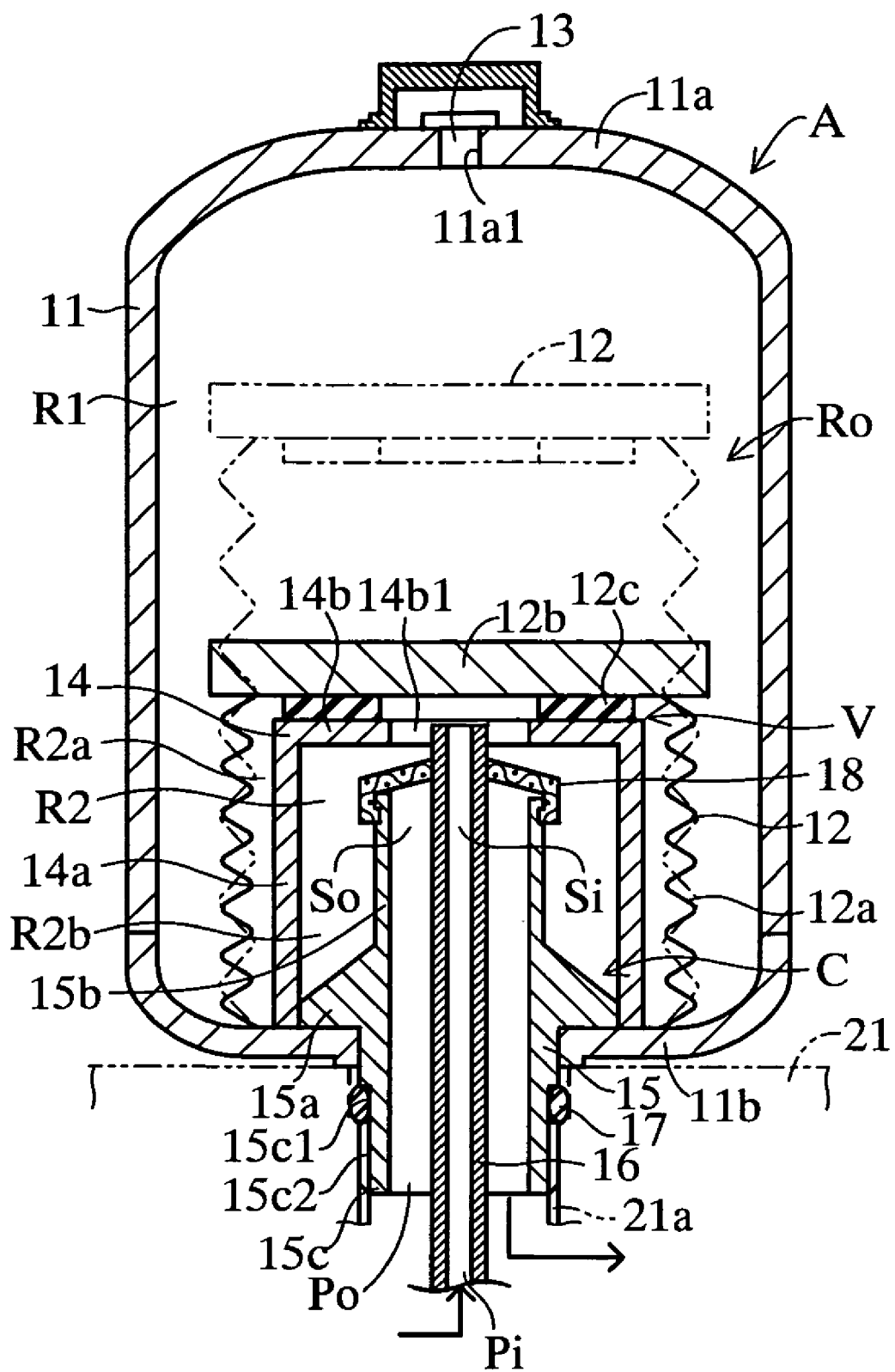
FIG. 1 is a cross-sectional view of a metal bellows hydraulic accumulator according to one embodiment of the present invention.
Figure 2:
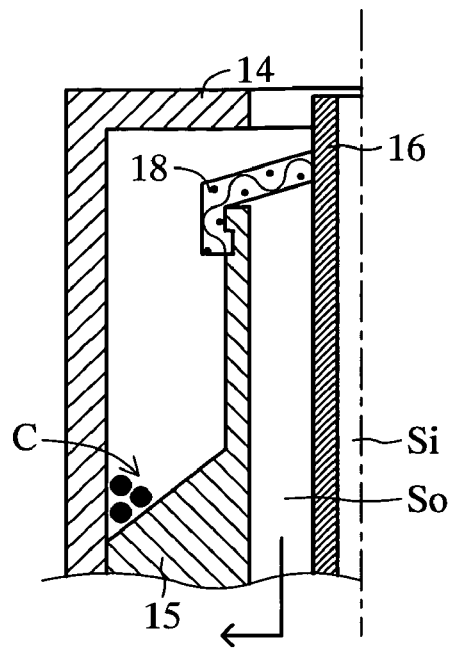
FIG. 2 is an enlarged cross-sectional view of a main portion of FIG. 1.

Embodiments of the present invention will now be described with the drawings. FIGS. 1 and 2 show a metal bellows hydraulic accumulator A according to one embodiment of the present invention. The hydraulic accumulator A includes a shell 11 serving as a pressure vessel, which defines a pressure space Ro therein; and a bellows unit 12 disposed within the pressure space Ro. The shell 11 is constituted by upper and lower shell halves, which are joined together in a liquid-tight state. A plug 13 is fitted in an airtight manner in a gas-filling port 11a1 formed in an upper end wall 11a of the shell 11.

The bellows unit 12 includes a cylindrical, tubular bellows portion 12a formed of metal; and a metallic movable plate 12b, which is connected in an airtight and liquid-tight state to an upper end of the bellows portion 12a. A lower end of the bellows portion 12a is fixed in an airtight and liquid-tight state to a lower end wall 11b of the shell 11. Thus, the pressure space Ro is sectioned into an outer chamber serving as a gas chamber R1, which is filled with predetermined pressurized gas; and an inner liquid chamber serving as a liquid chamber R2, which communicates with a liquid inflow port Pi and a liquid outflow port Po formed below the shell 11, via an inflow passage Si and an outflow passage So, respectively. The liquid inflow port Pi and the liquid outflow port Po are provided below the liquid chamber R2. Located inside the bellows unit 12; namely, inside the liquid chamber R2, are a stay 14, a tubular member 15, and a pipe 16.

The stay 14, which serves as a partition member, sections the liquid chamber R2 within the bellows unit 12 into a first liquid chamber R2a to which the bellows portion 12a of the bellows unit 12 is exposed, and a second liquid chamber R2b to which upper ends of the inflow passage Si and the outflow passage So are opened. Further, the stay 14 restricts contraction of the bellows unit 12. The stay 14 has a cylindrical, tubular wall portion 1 4a and an upper bottom wall portion 14b. A lower end of the cylindrical, tubular wall portion 14a is fixed in a liquid-tight state to the lower end wall 11b of the shell 11. The upper bottom wall portion 14b is formed integrally with an upper end of the cylindrical, tubular wall portion 14a. Further, a communication passage hole 14b1 connecting the first liquid chamber R2a and the second liquid chamber R2b is formed in the upper bottom wall portion 14b of the stay 14.

An annular flange portion 15a of the tubular member 15 is fixed in a liquid-tight state to the lower end wall 11b of the shell 11 and the cylindrical, tubular wall portion 14a of the stay 14. The tubular member 15 has an upper tubular portion 15b projecting toward an upper portion of the second liquid chamber R2b, and a lower tubular portion 15c extending downward through the lower end wall 11b of the shell 11. Further, the outflow passage So is formed in a central portion of the tubular member 15. A lower end of the outflow passage So communicates with the liquid outflow port Po, and an upper end of the outflow passage So is open to an upper portion of the second liquid camber R2b.

Further, an O-ring attachment groove 15c1 and a male-threaded attachment portion 15c2 are formed on the lower tubular portion 15c of the tubular member 15, and an O-ring 17 is fitted into the O-ring attachment groove 15c. With the O-ring 17 fitted into the O-ring attachment groove 15c1, the male-threaded attachment portion 15c2 is threadedly inserted into a female-threaded hole 21a of a pump body 21, which serves as a support member, whereby the hydraulic accumulator A is removably attached to the pump body 21.

The pipe 16 is disposed coaxially with the outflow passage So of the tubular member 15 and extends through the tubular member 15. A lower end portion of the pipe 16 is fixedly connected to an inflow path (not shown) of the pump body 21. Further, the inflow passage Si is formed in the central portion of the pipe 16. A lower end portion of the inflow passage Si communicates with the liquid inflow port Pi, and the upper end of the inflow passage Si is open to an upper portion of the second liquid chamber R2b.

Further, in the present embodiment, an annular sealing member 12c formed of rubber is carried by a lower surface of the movable plate 12b of the bellows unit 12, which surface faces the upper bottom wall portion 14b of the stay 14. The annular sealing member 12c is a valve element, which comes into and out of contact with the upper bottom wall portion 14b (valve seat) of the stay 14. The annular sealing member 12c and the upper bottom wall portion 14b of the stay 14 constitute an open-close valve V.

The open-close valve V establishes and breaks communication between the first liquid chamber R2a and the second liquid chamber R2b. When opened, the open-close valve V establishes communication between the first liquid chamber R2a and the second liquid chamber R2b. When closed, the open-close valve V breaks the communication between the first liquid chamber R2a and the second liquid chamber R2b, to thereby restrict the amount of contraction of the bellows portion 12a of the bellows unit 12 (the amount of deformation of the bellows portion 12a attributable to pressing force of gas charged in the gas chamber R1 toward the first liquid chamber R2a at the time when the liquid pressure within the first liquid chamber R2a becomes lower than the pressure of the gas charged in the gas chamber R1).

In the present embodiment, a filter 18 is provided on an upper end portion (an end portion toward the second liquid chamber R2b) of the outflow passage So, and a foreign-matter storing section C is formed between the stay 14 and the tubular member 15. The filter 18 serves as separation means for separating foreign matter from operating liquid flowing toward the outflow passage So, and also serves as entry prevention means for preventing entry of foreign matter into the outflow passage So; i.e., preventing foreign matter from flowing out of the hydraulic accumulator A. The filter 18 covers the upper end opening of the outflow passage So, while allowing passage of operating liquid therethrough. The filter 18 assumes a taper shape so as to cause foreign matter to fall down, along the outer circumferential surface thereof, toward the foreign-matter storing section C. The foreign-matter storing section C has an open upper end and a closed bottom portion, and stores foreign matter in the bottom portion. The foreign-matter storing section C is formed around the cylindrical wall of the upper tubular portion 15b, which forms the outflow passage So, at a location which is hardly influenced by flow of operating liquid.

The thus-constructed hydraulic accumulator A of the present embodiment is used in such a manner that it communicates with a hydraulic circuit (e.g., hydraulic brake piping for a vehicle). In operation, when the bellows unit 12 changes its posture from a posture indicated by a solid-line to a posture indicated by an imaginary line in FIG. 1, pressurized liquid from the hydraulic circuit (a discharge portion of the pump) is accumulated in the first liquid chamber R2a. When the bellows unit 12 changes its posture from the posture indicated by the imaginary line to the posture indicated by the solid line in FIG. 1, pressurized liquid is returned from the first liquid chamber R2a to the hydraulic circuit.

Incidentally, in the hydraulic accumulator A of the present embodiment, in the second liquid chamber R2b, into which the upper ends of the inflow passage Si and the outflow passage So are opened, there are provided the filter 18, which separates foreign matter contained in operating liquid flowing toward the upper end of the outflow passage So, and the foreign-matter storing section C, which has an open upper end and a closed bottom portion, and stores foreign matter in the bottom portion.

Therefore, in the case where the open-close valve V becomes unable to properly function because of breakage of the annular rubber sealing member 12c, which is a constituent member of the open-close valve V, and debris produced as a result of breakage of the sealing member 12c is mixed into operating liquid as foreign matter, or in the case where foreign matter generated upstream of the hydraulic accumulator A is mixed into operating liquid, the filter 18 separates the foreign matter contained in operating liquid, and the separated foreign matter is stored in the foreign-matter storing section C, whereby the foreign matter is prevented from flowing out of the hydraulic accumulator A. Therefore, the above-described foreign matter does not adversely influence the hydraulic circuit outside the accumulator A, whereby the influence on the hydraulic circuit including the accumulator A can be minimized.

In the present embodiment, the filter 18 assumes a taper shape so as to cause foreign matter to fall down, along the outer circumferential surface thereof, toward the foreign-matter storing section C. Therefore, the taper-shaped filter 18 can cause foreign matter, separated by means of the filter 18, to fall down toward the foreign-matter storing section C and to be stored and held there without fail. Further, the taper-shaped filter 18 can prevent foreign matter from remaining on the filter 18, to thereby prevent clogging of the filter 18.

In the above-described embodiment, as shown in FIGS. 1 and 2, the outflow passage So is disposed coaxially with the inflow passage Si to surround the inflow passage Si, and the foreign-matter storing section C is formed around the cylindrical wall which forms the outflow passage So. However, this arrangement may be modified as in another embodiment shown in FIG. 3. Specifically, the inflow passage Si is disposed coaxially with the outflow passage So to surround the outflow passage So, and the foreign-matter storing section C is formed around the cylindrical wall which forms the inflow passage Si.

Figure 3:
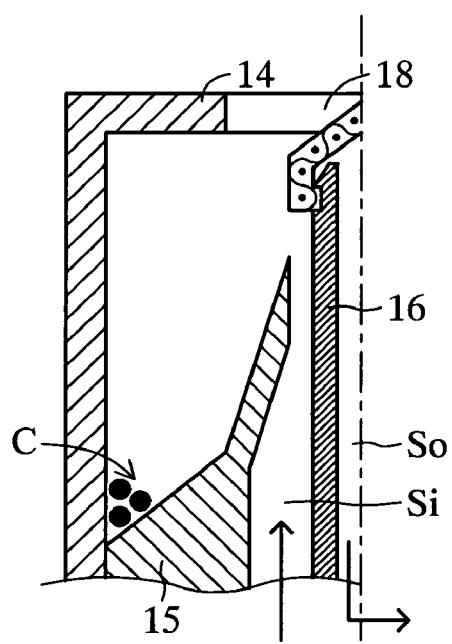
FIG. 3 is an enlarged cross-sectional view of a main portion of a metal bellows hydraulic accumulator according to another embodiment of the present invention.

In the embodiment shown in FIG. 3, the cylindrical wall which forms the foreign-matter storing section C assumes a taper shape so as to cause foreign matter to fall down, along the outer circumferential surface thereof, toward the foreign-matter storing section C. Therefore, the tapered cylindrical wall can cause foreign matter, separated by means of the filter 18 and falling therefrom, to fall down toward the foreign-matter storing section C and to be stored and held there without fail. Notably, in the embodiment shown in FIG. 3, the liquid inflow port Pi and the inflow passage Si are provided in the tubular member 15, whereas the liquid outflow port Po and the outflow passage So are formed in a pipe (tubular member) 16. The structure of the remaining portion is substantially the same as that of the above-described embodiment shown in FIG. 1.

Figure 4:
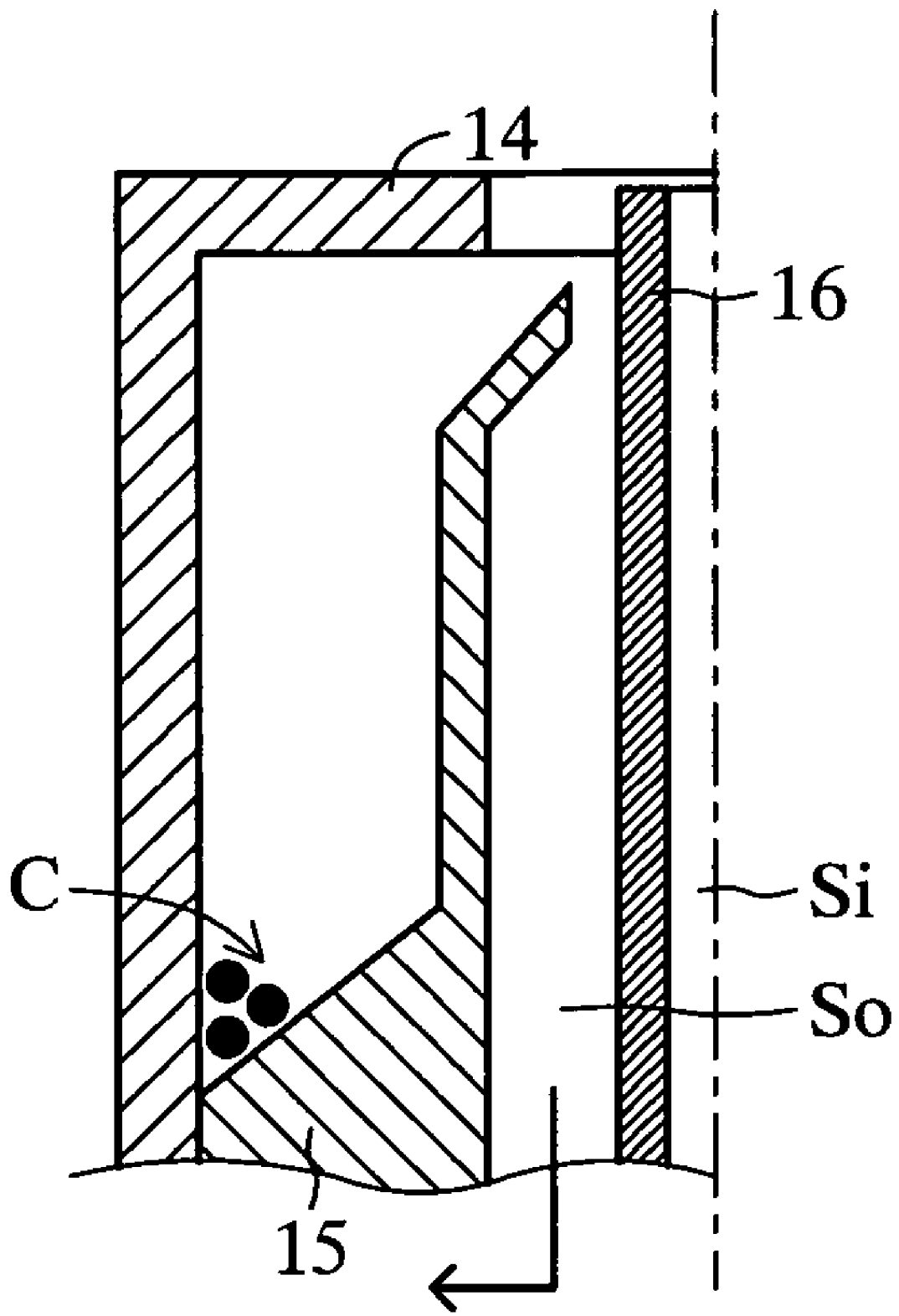
FIG. 4 is an enlarged cross-sectional view of a main portion of a metal bellows hydraulic accumulator according to still another embodiment of the present invention.

In the above-described embodiment, as shown in FIGS. 1 and 2, the filter 18 is provided at an inflow side end (upper end) of the outflow passage So. However, this arrangement may be modified as in still another embodiment shown in FIG. 4. Specifically, the filter 18 is omitted, and an upper end portion of the tubular member 15 is tapered so as to become smaller in diameter toward the upward direction, such that an inclined annular end wall extends from the upper end of the tubular member 15 toward the outflow passage So. The inclined annular end wall serves as separation means.

In the above-described embodiments, the inflow passageway Si connecting the second liquid chamber R2b and the liquid inflow port Pi is disposed coaxially with the outflow passageway So connecting the second liquid chamber R2b and liquid outflow port Po. Alternatively, the inflow passageway Si and the outflow passageway So may be disposed in parallel (substantially in parallel). Further, the pipe 16 employed in the respective embodiments may be omitted, and liquid passage formed by the tubular member 15 may be used as an inflow-outflow passage. In these cases as well, the same operation and effects as those in the above-described embodiments can be achieved.

Obviously, numerous modifications and variations of the present invention are possible in light of the above teachings. It is therefore to be understood that within the scope of the appended claims, the present invention may be practiced otherwise than as specifically described herein.

What is claimed is:

1. A metal bellows hydraulic accumulator comprising:
a pressure vessel defining a pressure space;
a bellows unit having a bellows portion formed of metal, the bellows unit being disposed within the pressure space and sectioning the pressure space into a gas chamber filled with a pressurized gas, and a liquid chamber communicating with a liquid passage formed in the pressure vessel;
a partition member for sectioning the liquid chamber into a first liquid chamber to which the bellows portion of the bellows unit is exposed, and a second liquid chamber to which the liquid passage is opened;
an open-close valve which establishes communication between the first liquid chamber and the second liquid chamber when opened, and breaks the communication between the first liquid chamber and the second liquid chamber when closed, to thereby restrict the amount of contraction of the bellows portion of the bellows unit;
separation means, provided in the second liquid chamber, for separating foreign matter contained in operating liquid flowing toward the liquid passage; and a foreign-matter storing section provided in the second liquid chamber, the foreign-matter storing section having an open upper end and a closed bottom portion, and being capable of storing the foreign matter.

2. A metal bellows hydraulic accumulator according to claim 1, wherein the liquid passage includes an inflow passage for allowing operating liquid to flow from the outside of the pressure vessel to the second liquid chamber, and an outflow passage for allowing operating liquid to flow from the second liquid chamber to the outside of the pressure vessel; and a filter serving as the separation means is provided at a second-liquid-chamber-side end of the outflow passage in order to separate the foreign matter and prevent the foreign matter from flowing to the outside.

3. A metal bellows hydraulic accumulator according to claim 2, wherein the outflow passage is formed coaxially with the inflow passage to surround the inflow passage; the foreign-matter storing section is formed around a cylindrical wall which forms the outflow passage; and the filter assumes a taper shape so as to cause the foreign matter to fall down, along an outer circumferential surface of the filter, toward the foreign-matter storing section.

4. A metal bellows hydraulic accumulator according to claim 2, wherein the inflow passage is formed coaxially with the outflow passage to surround the outflow passage; the foreign-matter storing section is formed around a cylindrical wall which forms the inflow passage; and the cylindrical wall assumes a taper shape so as to cause foreign matter to fall down, along an outer circumferential surface of the cylindrical wall, toward the foreign-matter storing section.

* * * * *